US008452639B2

(12) United States Patent
Abe et al.

(10) Patent No.: US 8,452,639 B2
(45) Date of Patent: *May 28, 2013

(54) SYSTEM AND METHOD FOR MARKETING MIX OPTIMIZATION FOR BRAND EQUITY MANAGEMENT

(75) Inventors: Naoki Abe, Rye, NY (US); Edwin P Pednault, Cortlandt Manor, NY (US)

(73) Assignee: International Business Machines Corporation, Armonk, NY (US)

(*) Notice: Subject to any disclaimer, the term of this patent is extended or adjusted under 35 U.S.C. 154(b) by 420 days.

This patent is subject to a terminal disclaimer.

(21) Appl. No.: 12/054,745

(22) Filed: Mar. 25, 2008

(65) Prior Publication Data
US 2008/0177621 A1 Jul. 24, 2008

Related U.S. Application Data

(63) Continuation of application No. 11/335,684, filed on Jan. 20, 2006.

(51) Int. Cl.
*G06Q 10/00* (2012.01)
(52) U.S. Cl.
USPC .......................................................... 705/7.31
(58) Field of Classification Search
USPC ................................... 705/7, 10, 7.31, 14.52
See application file for complete search history.

(56) References Cited

U.S. PATENT DOCUMENTS

| 7,003,476 B1* | 2/2006 | Samra et al. ........................ 705/10 |
| 7,403,904 B2* | 7/2008 | Abe et al. .......................... 705/10 |
| 7,406,434 B1* | 7/2008 | Chang et al. ....................... 705/10 |
| 2004/0015386 A1* | 1/2004 | Abe et al. .......................... 705/10 |
| 2006/0253309 A1* | 11/2006 | Ramsey et al. .................... 705/7 |

FOREIGN PATENT DOCUMENTS

WO WO0129692 A2 * 4/2001

OTHER PUBLICATIONS

Optimizing Rhenania's direct marketing business through dynamic multilevel modeling.. R Elsner, M Krafft, A Huchzermeier—Marketing Science, 2004—jstor.org.*
Customer's time-variant purchase behavior and corresponding marketing strategies: an online retailer's case SH Ha, SM Bae, SC Park—Computers & Industrial Engineering, 2002—Elsevier.*
A tractable POMDP for a class of sequencing problems P Rusmevichientong, B Van Roy—Proceedings of the 17th Conference in . . . , 2001—Citeseer.*
An intelligent system for customer targeting: a data mining approach YS Kim, WN Street—Decision Support Systems, 2004—Elsevier.*
Cross channel optimized marketing by reinforcement learning psu. edu [PDF] N Abe, N Verma, C Apte, R Schroko—Proceedings of the tenth ACM . . . , 2004—portal.acm.org.*
An examination of selected marketing mix elements and brand equity [PDF] from hofstra.edu, B Yoo, N Donthu . . . —Journal of the Academy of Marketing . . . , 2000—jam.sagepub.com.*

(Continued)

*Primary Examiner* — Jonathan G Sterrett
(74) *Attorney, Agent, or Firm* — Whitham, Curtis, Christofferson & Cook, P.C; Daniel P. Morris

(57) ABSTRACT

A method of marketing optimization with respect to brand lifetime management formulates a problem of brand equity maximization utilizing Markov Decision Process (MDP) thereby casting brand equity management as a long term regard optimization problem in MDP, The marketing mix is optimized by formulating the mix as actions in MDP and, utilizing historical marketing and transaction data, aspects of the MDP are estimated.

8 Claims, 5 Drawing Sheets

OTHER PUBLICATIONS

Challenges and opportunities facing brand management: an introduction to the special issue [PDF] from umn.eduAD Shocker, RK Srivastava . . . —Journal of Marketing Research, 1994—JSTOR.*

Ching, W, et al., "Customer migration, campaign budgeting, revenue estimation: the elasticity of Markov Decision Process on customer lifetime value", Advanced Modeling and Optimization, vol. 6, No. 2, 2004, 65-80.

Tirenni, G. R., et al., "Efficient Allocation of Marketing Resources using Dynamic Programming", SIAM 2005. 5 pages.

Tirenni, G. R., "Allocation of Marketing Resources to Optimize Customer Equity", Dissertation. No. 3038, University of St. Gallen. 2005.

* cited by examiner

Procedure Batch-RL(sarsa)
Premise:
  A base learning module, Base, for regression is given.
Input data: $D = \{e_i | i = 1, ..., N\}$ where
  $e_i = \{(s_{i,j}, a_{i,j}, r_{i,j})\} | j = 1, ..., l_i\}$
  ($e_i$ is the $i$-th episode, and $l_i$ is the length of $e_i$.)
1. For all $e_i \in D$
   $D_{0,i} = \{(s_{i,j}, a_{i,j}, r_{i,j})\} | j = 1, ..., l_i\}$
2. $D_0 = \bigcup_{i=1,...,N} D_{0,i}$
3. $Q_0 = \text{Base}(D_0)$.
4. For $k = 1$ to $final$
   4.1 For all $e_i \in D$
      4.1.1 For $j = 1$ to $l_i - 1$
         4.1.1.1 $v_{i,j}^{(k)} = Q_{k-1}(s_{i,j}, a_{i,j})$
            $+ a_k (r_{i,j} + \gamma Q_{k-1}(s_{i,j+1}, a_{i,j+1})$
            $- Q_{k-1}(s_{i,j}, a_{i,j}))$
      4.1.2 $D_{k,i} = \{(s_{i,j}, a_{i,j}, v_{i,j}^{(k)}) | j = 1,...,l_i - 1\}$
   4.2 $D_k = \bigcup_{i=1,...,N} D_{k,i}$
   4.3 $Q_k = \text{Base}(D_k)$
5. Output the final model, $Q_{final}$ Procedure Batch-RL(Q)
Identical to Batch-RL(sarsa) except 4.1.1.1 is replaced by:
   4.1.1.1 $v_{i,j}^{(k)} = Q_{k-1}(s_{i,j}, a_{i,j})$
      $+ a_k(r_{i,j} + \gamma \max_a Q_{k-1}(s_{i,j+1}, a)$
      $- Q_{k-1}(s_{i,j}, a_{i,j}))$

*Figure 4*

SYSTEM AND METHOD FOR MARKETING MIX OPTIMIZATION FOR BRAND EQUITY MANAGEMENT

CROSS REFERENCE TO RELATED APPLICATION

The invention disclosed in the present application is related to the invention disclosed in U.S. patent application Ser. No. 10/198,102 filed Jul. 19, 2002, by Naoki Abe and Edwin P. Pednault for "System and Method for Sequential Decision Making for Customer Relationship Management" and assigned to a common assignee herewith. The disclosure of U.S. patent application Ser. No. 10/198,102 is incorporated herein by reference.

BACKGROUND OF THE INVENTION

1. Field of the Invention

The present application generally relates to the optimization of marketing mix from the point of view of brand management and, more particularly, to the formulation of the sequential marketing mix optimization with respect to brand equity management as a Markov Decision Process.

2. Background Description

There is an increasing interest in the use of predictive data mining techniques to optimize the total effectiveness of marketing mix from the point of view of brand management. Unlike most of the existing targeted marketing scenarios, the current problem focuses on optimizing a broad spectrum of marketing activities including mass marketing. As a result, the transaction data to be used for analysis may not be tied to individual customers, as is the case for the invention disclosed and claimed in U.S. patent application Ser. No. 10/198,102. Therefore, methods are needed that can optimize marketing mix given transaction data, not linked to customers.

Another aspect that is lacking in existing approaches for marketing mix optimization/modeling is the notion of optimizing sequences of marketing mix decisions over the lifetime of a brand so as to best manage the various stages of a brand's lifetime. Existing approaches mostly focus on the issue of accurate modeling of the effect of marketing mix given highly noisy data. While this is an important technical challenge that need be addressed, it alone does not address the problem of optimizing sequences of marketing mix decisions over time.

SUMMARY OF THE INVENTION

It is therefore an object of this invention to provide a means by which to address the issue of optimizing sequences of marketing mix decisions through brand lifetime, based on transaction data that are tied to products/brands, rather than customers.

According to the present invention, a novel process is provided in the formulation of the sequential marketing mix optimization with respect to brand equity management as a Markov Decision Process (MDP).

More particularly, the method according to the invention formulates the problem of brand equity maximization utilizing MDP, thus casting the brand equity management problem as that of a long term reward optimization problem in MDP. In addition, the method according to the invention utilizes historical marketing and transaction data to estimate aspects of the MDP and which, optionally, generates marketing rules optimized with respect to the MDP and which, optionally, optimizes marketing media mix with respect to brand lifetime management for any given brand.

BRIEF DESCRIPTION OF THE DRAWINGS

The foregoing and other objects, aspects and advantages will be better understood from the following detailed description of a preferred embodiment of the invention with reference to the drawings, in which:

FIG. 4 provides a possible pseudo-code for one version of batch reinforcement learning based on Q-learning according to the present invention.

DETAILED DESCRIPTION OF PREFERRED EMBODIMENTS OF THE INVENTION

The present invention effectively deals with the above-mentioned problems of conventional systems. In many practical cases, the present invention may result in a significant increase in the total profits obtained over state-of-the-art approaches.

The present invention includes a system and method of marketing mix optimization for product/brand equity management which may apply, for example, a framework of reinforcement learning to address the issue of sequential decision making when interactions can occur among decision outcomes. Reinforcement learning refers to a class of problems and associated techniques in which the learner is to learn how to make sequential decisions based on delayed reinforcement so as to maximize cumulative rewards.

More specifically, the present invention may utilize the popular Markov Decision Process (MDP) framework. MDP provides an advanced framework for modeling general media-mix marketing and corporate/product branding strategy. The method according to the invention combines MDP with predictive modeling to handle complex combination of a large variety of factors, marketing actions and effects.

In a Markov Decision Process (MDP), the environment is assumed to be in some state at any given point in time. In the case of brand/product marketing, such states would be represented as feature vectors comprising categorical and numerical data fields that characterize what is known about each product/brand at the time a decision is made. The state could summarize information on the stage/phase of branding strategy and/or product brand development, and/or the interactions between the enterprise and environment, e.g., economy, competitive landscape, etc.

Figure 1:
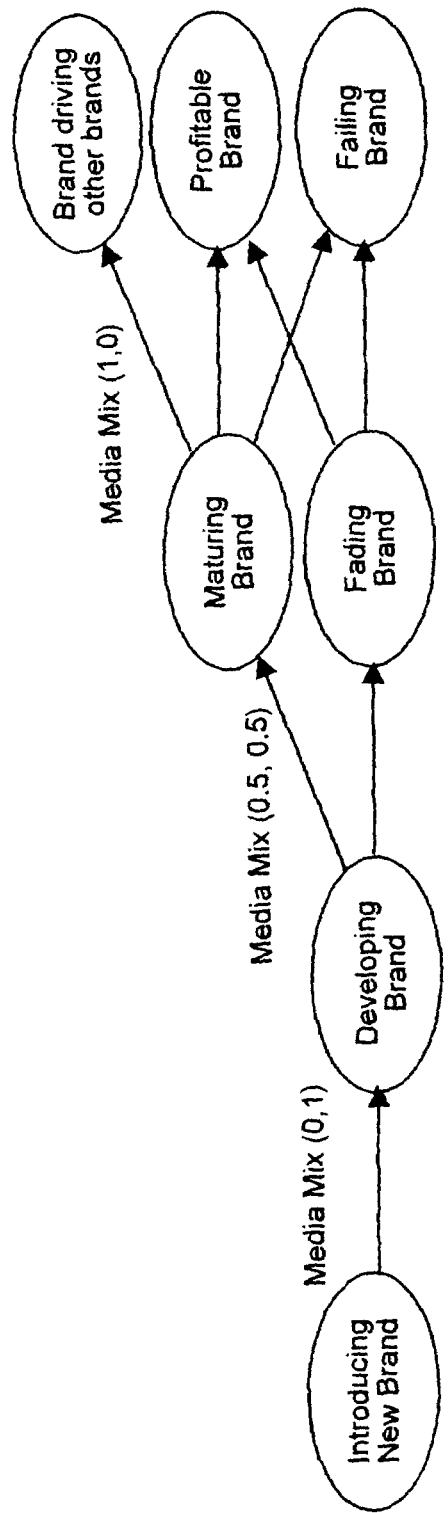
FIG. 1 provides an illustrative example of how Markov Decision Process can be used to formalize the process of marketing mix optimization for brand equity management.

Referring now to the drawings, and more particularly to FIG. 1, there is illustrated a simple schematic example of how the method according to the invention formulates the problem marketing mix optimization for brand equity management as an MDP. In FIG. 1, each of the stages, represented by balloons, is defined as a "state". A "state" should quantify the state that the enterprise-environment interaction is in. The "state" could summarize information on the stage/phase of branding strategy and/or product brand development, and/or the interactions between the enterprise and environment, e.g., economy, competitive landscape, etc. "State" will in general be represented by vectors of attributes quantifying above. "Action" may be a vector quantifying marketing media-mix (e.g., budget portfolio).

When the learner takes an action, it receives a finite reward and the environment makes a probabilistic transition to another state. The goal of a learner is to learn to act so as to maximize the cumulative reward it receives (usually with future rewards discounted) as the learner takes actions and traverses through the state space. In the case of product/brand marketing, a brand, with all its past history of marketing actions and transactions, is in a certain state at any given point in time. When an enterprise takes an action, the brand then makes a probabilistic transition to another state, possibly generating a reward. This process continues throughout the life of the brand. The reward at each state transition is the net profit to the enterprise for the brand in question. It takes into account both the purchases of products/brands under consideration in response to the enterprise's marketing actions, and the cost of those actions. The reward can thus be negative if marketing actions result in no purchases, which represents a net loss. Application of reinforcement learning to this problem amounts to maximizing the net present value of profits and losses over the life cycle of a product/brand, or a set of them.

System Architecture and Control Flow

Figure 2:
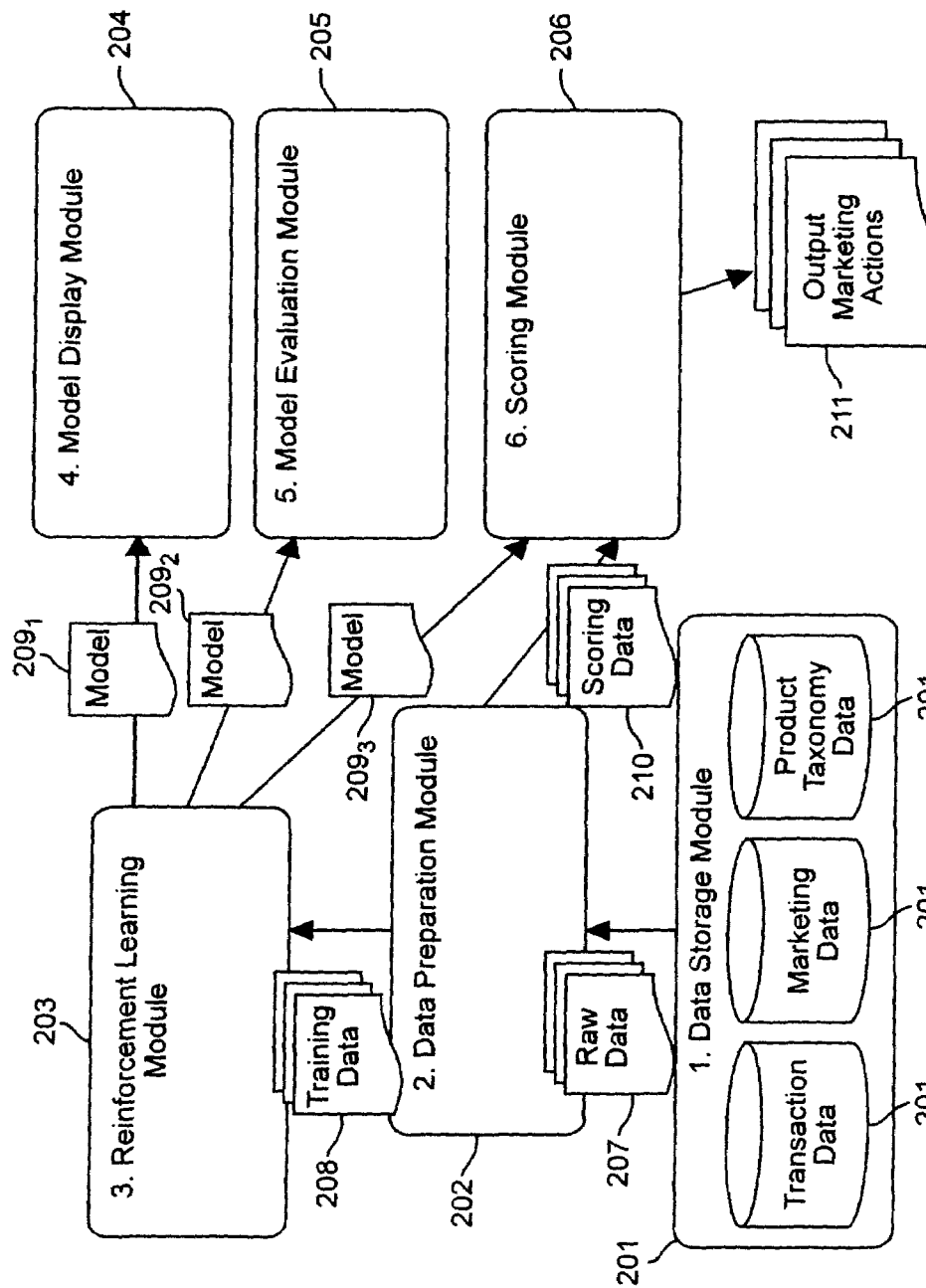
FIG. 2 provides a block diagram for the system according to the preferred embodiment of the invention.

FIG. 2 is a block diagram for a preferred embodiment of the system of the present invention. The system comprises of the following modules: data storage module 201; data preparation module 202; reinforcement learning module 203; model display module 204; model evaluation module 205; and scoring module 206. Data storage module 201 includes transaction data store $201_1$, marketing data store $201_2$ and product taxonomy data store $201_3$. The data from these data stores are provided as raw data 207 to the data preparation module 202. This raw data is processed by the data preparation module 202, and the processed data is output as training data 208 to the reinforcement learning module 203. The reinforcement learning module 203 generates models $209_1$, $209_2$ and $209_3$, respectively, to each of the model display module 204, the model evaluation module 205 and the scoring module 206. The scoring module 206 additionally receives scoring data 210 from the data preparation module 202 and generates output marketing actions 211.

Figure 3:
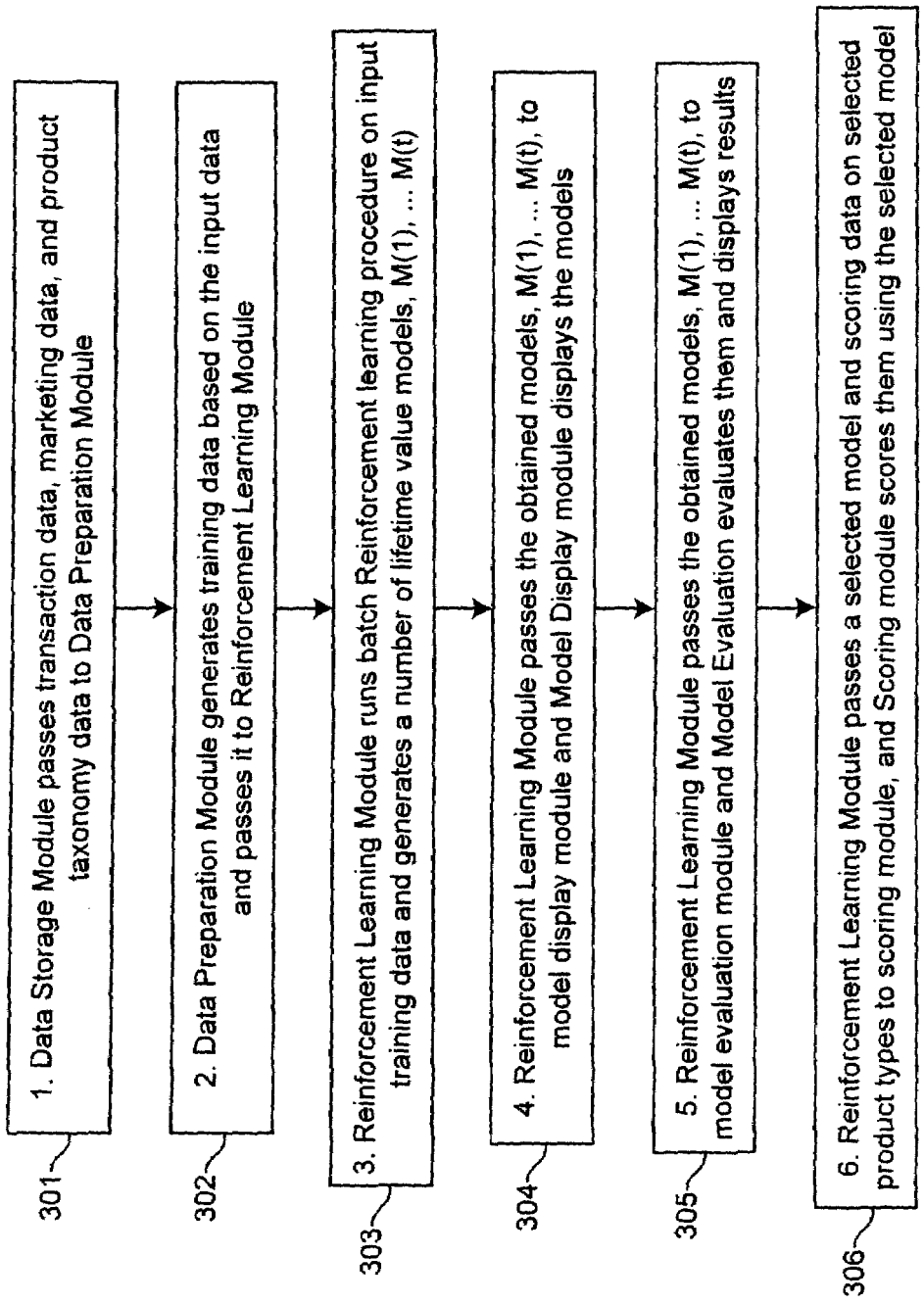
FIG. 3 is a flow chart for the method according to the invention, making references to the system shown in FIG. 2.

FIG. 3 shows the flow chart of the method, which can be implemented on the system as shown in FIG. 2. With reference now to both FIGS. 2 and 3, the method shown in FIG. 3 begins in function block 301 by accessing the data storage module 201 by the data preparation module 202. In this step, data are obtained that are required for the reinforcement learning module 203, which consist of transaction data, marketing data, and possibly product taxonomy data. The transaction data contain historical, dated records of transactions, with information that specifies the product items sold and the corresponding sales and possibly profit amounts. The product item information can then be joined with the product taxonomy data, if they exist, to retrieve product taxonomy attributes for the transactions under consideration. The data preparation module 202 also accesses the marketing data, which consist of historical, dated records of marketing actions, which should ideally contain information on the product types or product taxonomy attributes of the products that are the subject of the corresponding marketing activities.

In function block 302, the data preparation module 202 processes the raw data to generate the training data that will be required by the reinforcement learning module 203. As will be elaborated in the section on "Reinforcement Learning", these data will be episodic data; that is, each record captures the state, represented by attributes that summarize the marketing and transaction history as well as the product taxonomy attributes about a particular product item under consideration. There will be in general multiple records, corresponding to different time steps, for each product type. There will also be potentially many groups of such records, corresponding to the variety of product items under consideration.

Having received episodic data from the data preparation module 202, the reinforcement learning module 203 applies a so-called batch reinforcement learning method on this data set in function block 303, and obtains a number of models $109_i$ of lifetime value, for example, those of the so-called Q-value function, which will be explained in detail in the section on "Reinforcement Learning". The generated models will be optionally passed to the model display module 204 to be displayed for inspection by the user, in function block 304, and optionally to the model evaluation module 205 in function block 305, which evaluates the effectiveness of the resulting models, using such criteria as the long term profitability of the marketing policy represented by them.

Finally, the models are passed to the scoring module 206 in function block 306. The scoring module 206 first generates the product profile attributes for each product of interest, which is analogous to the training data generation process, except it now only needs to generate attribute vectors, or product profiles, for the current time of decision making, rather than for a subset of the sequence of decision making time points available in the data. The scoring module 206 then uses the Q-value models and the generated product profiles to generate a nearly optimal marketing decision, such as marketing mix, for each product item or category of interest.

Reinforcement Learning

As briefly explained in the introduction, the present invention may utilize the popular Markov Decision Process (MDP) model in reinforcement learning with function approximation. For an introduction to reinforcement learning see, for example, R. S. Sutton and A. G. Barto, *Reinforcement Learning: An Introduction*, MIT Press, 1998; and L. P. Kaelbling, M. L. Littman, and A. W. Moore, "Reinforcement learning: A survey", *Journal of Artificial Intelligence Research*, 4, 1996. The following is a brief description of an MDP.

At any point in time, the environment is assumed to be in one of a set of possible states. At each time tick (the present invention may assume a discrete time clock), the environment is in some state s, the learner takes one of several possible actions a, receives a finite reward (i.e., a profit or loss) r, and the environment makes a transition to another state s'. Here, the reward r and the transition state s' are both obtained with probability distributions that depend on the state s and action a.

The environment starts in some initial state $s_0$ and the learner repeatedly takes actions indefinitely. This process results in a sequence of actions $$\{a_t\}_{t=0}^{\infty},$$

rewards $$\{r_t\}_{t=0}^{\infty},$$

and transition states $$\{s_t\}_{t=0}^{\infty}.$$

The goal of the learner is to maximize the total rewards accrued over time, usually with future rewards discounted. That is, the goal is to maximize the cumulative reward R, $$R = \sum_{t=0}^{\infty} \gamma^t r_t, \quad (1)$$

where $r_t$ is the reward obtained at the t'th time step and $\gamma$ is some positive constant less than 1. In financial terms, $\gamma$ is a discount factor for calculating the net present value of future rewards based on a given interest rate.

Generally speaking, a learner follows a certain policy to make decisions about its actions. This policy can be represented as a function $\pi$ mapping states to actions such that $\pi(s)$ is the action the learner would take in state s. A theorem of Markov Decision Processes is that an optimum policy $\pi^*$ exists that maximizes the cumulative reward given by Equation (1) for every initial state $s_0$.

In order to construct an optimum policy $\pi^*$, a useful quantity to define is what is known as the value function $Q^\pi$ of a policy. A value function maps a state s and an action a to the expected value of the cumulative reward that would be obtained if the environment started in state s, and the learner performed action a and then followed policy $\pi$ forever after. $Q^\pi(s, a)$ is thus defined as $$Q^\pi(s, a) = E_\pi\left[\sum_{t=0}^{\infty} \gamma^t r_t | s_0 = s, a_{0=a}\right], \quad (2)$$

where $E_\pi$ denotes the expectation with respect to the policy $\pi$ that is used to define the actions taken in all states except the initial state $s_0$.

A remarkable property of Markov Decision Processes is that the value function Q* of an optimum policy $\pi^*$ satisfies the following recurrence relation, known as the Bellman optimality equation:

$$Q*(s, a) = E_r[r | s, a] + \gamma E_{s'}\left[\max_{a'} Q*(s', a') | s, a\right], \quad (3)$$

where the first $E_r[r|s,a]$ is the expected immediate reward obtained by performing action a in state s, and the second term $$E_{s'}\left[\max_{a'} Q*(s', a') | s, a\right]$$

is the expected cumulative reward of performing the optimum action in the transition state $s_0$ that results when action a is performed in state s.

The Bellman equation can be solved via fixed-point iteration using the following system of equations:

$$Q_0(s, a) = R(s, a) \quad (4)$$

$$Q_{k+1}(s, a) = R(s, a) + \gamma \sum_{s'} P(s' | s, a) \max_{a'} Q_k(s', a'),$$

where R(s,a) is the expected immediate reward $E_r[r|s,a]$ and P(s'|s,a) is the probability of ending up in state s' when action a is performed in state s. This solution method is known as value iteration. In the limit, $Q_k(s,a)$ converges to Q*(s,a) a k tends to infinity. The optimum policy is then given by $$\pi*(s) = \operatorname*{argmax}_a Q*(s, a).$$

The use of Equation (4), however, requires knowledge of both the expected reward R(s,a) for each state-action pair as well as the state transition probabilities P(s'|s,a). In learning situations these functions are unknown. Therefore, the problem faced by the learner is to infer an optimum policy (e.g., a near optimum policy) over time through observation and experimentation.

Several approaches are known in the literature. One popular reinforcement-learning method known as Q-learning, attributed to Watkins (see, e.g., C. J. C. H. Watkins, *Learning from Delayed Rewards*, PhD thesis, Cambridge University, Cambridge, 1989), is based on the Bellman equation (Equation (3)) and value iteration (Equation (4)). Q-learning estimates optimum value functions in an online fashion when the sets of possible states and actions are both finite. The method starts with some initial estimates of the Q-values for each state and then updates these estimates at each time step according to the following equation:

$$Q(s_t, a_t) \to Q(s_t, a_t) + \alpha\left(r_{t+1} + \max_{a'} Q(s_{t+1}, a') - Q(s_t, a_t)\right) \quad (5)$$

It is known that, with some technical conditions, the above procedure probabilistically converges to the optimal value function (e.g., see C. J. C. H. Watkins and P. Dayan "Q-learning", *Machine Learning*, 8:279-292, 1992). The parameter $\alpha$ affects the rate of convergence of the update rule, as well as the asymptotic residual error in the estimate of the value function as the time step t tends to infinity. In order to obtain both a fast rate of convergence (which requires $\alpha$ to be large) and small asymptotic estimation error (which requires $\alpha$ to be small), the value of $\alpha$ is usually set up to be a decreasing function of time t. To ensure convergence, it is also necessary to repeatedly try every action in every reachable state in order to accurately estimate the value function for every state-action pair.

Batch Reinforcement Learning with Function Approximation

In the foregoing description of reinforcement learning, two simplifying assumptions were made that are not satisfied in the current setting. The first assumption is that the problem space consists of a reasonably small number of atomic states and actions. The Q-learning method described above performs value updates for each state-action pair, which requires that the number of such pairs be finite. In many practical applications, including marketing optimization, it is natural to treat the state space as a feature space with a large number of both categorical and real-valued features. In such cases, the state space is prohibitively large to represent explicitly, which renders the above methods impractical.

The second assumption that was made is the availability of online interaction with the environment. In applications like marketing optimization, this situation is typically not the case. In fact, it is quite the opposite. In marketing optimization, one usually has access to a very large amount of data accumulated from past transaction history from which an effective marketing strategy is to be derived. Moreover, the marketing strategy (i.e., the policy) must make simultaneous decisions for a collection of brands and products at a time. Online learning of policies, via reinforcement learning or otherwise, is not practical under these circumstances.

Bearing these factors in mind, the inventors propose to use so-called batch reinforcement learning methods with function approximation. Batch reinforcement learning refers to a form of reinforcement learning in which the learning does not take place in an online fashion as the learner performs actions and the environment traverses states. Instead, batch learning makes use of a potentially large volume of static training data that represents prior experience. The training data consists of sequences of states, actions, and resulting rewards. Batch learning thus reflects the realities of certain real-world applications like targeted marketing.

Function approximation amounts to representing the value function as some reasonable function of state features and actions (e.g., see X. Wang and T. Dietterich, "Efficient value function approximation using regression trees", *Proceedings of the IJCAI Workshop on Statistical Machine Learning for Large-Scale Optimization,* 1999). The usual online learning approach, by contrast, assigns explicit values to explicit state-action pairs. For marketing optimization purposes, the state features can include everything that is known about a product or a brand, such as product taxonomy information and past marketing and sales history.

Given such training data, batch reinforcement learning with function approximation attempts to estimate the value function Q(s, a) by reformulating value iteration (i.e., Equation (4)) as a supervised learning problem. In particular, on the first iteration, an estimate of the expected immediate reward function R(s, a) is obtained by using supervised learning methods to predict the value of R(s, a) based on the features that characterize the input state s and the input action a. On the second and subsequent iterations, the same supervised learning methods are used again to obtained successively improved predictions of Q(s, a) by using variants of Q-learning (Equation (5)) to recalculate the target values that are to be predicted for each iteration.

Referring again to the drawings, FIG. 4 provides a possible pseudo-code for a batch reinforcement learning based on Q-learning. The input training data D is assumed to include (e.g., consist of), or contain enough information to recover, episode data. An episode is a sequence of events, where each event consists of a state, an action, and a reward. Episodes preserve the temporal order in which events are observed. States $s_{i,j}$ are feature vectors that contain numeric and/or categorical data fields. Actions $a_{i,j}$ are assumed to be members of some pre-specified finite set. Rewards $r_{i,j}$ are real-valued. The base learning module, Base, takes as input a set of event data and outputs a regression model $Q_k$ that maps state-action pairs (s, a) to their estimated Q-values $Q_k$(s, a). In the two procedures shown in these figures, and in all variants considered later herein, $\alpha k$ is set to be $\alpha/k$ for some positive constant $\alpha<1$.

Base Regression Method

As a base learning method, the present invention may employ any regression method including, for example, a multivariate linear-regression tree method implemented in the IBM ProbE data mining engine (e.g., see, R. Natarajan and E. Pednault, "Segmented Regression Estimators for Massive Data Sets", *Second SIAM International Conference on Data Mining*, Arlington, Va.). This learning method produces decision trees with multivariate linear regression models at the leaves. Regression models are constructed as trees are built, and splits are selected to maximize the predictive accuracies of the regression models in the resulting child nodes. Feature selection is performed as part of both the tree building process (i.e., split selection) and the regression modeling process (i.e., variable selection). Likewise, pruning is performed both on the trees and on the regression models at the nodes.

Scoring

The goal of the scoring module 206 (FIG. 2) is to determine the optimal marketing action, such as marketing mix, for any product item, given a value function model, which is a function that determines the expected lifetime value given a state feature vector, and an action feature vector. The action feature vector, in the case of marketing mix optimization, will be a vector that specifies investment mix over a number of marketing media, such as mass marketing, printing, TV, email and catalogues.

Figure 5:
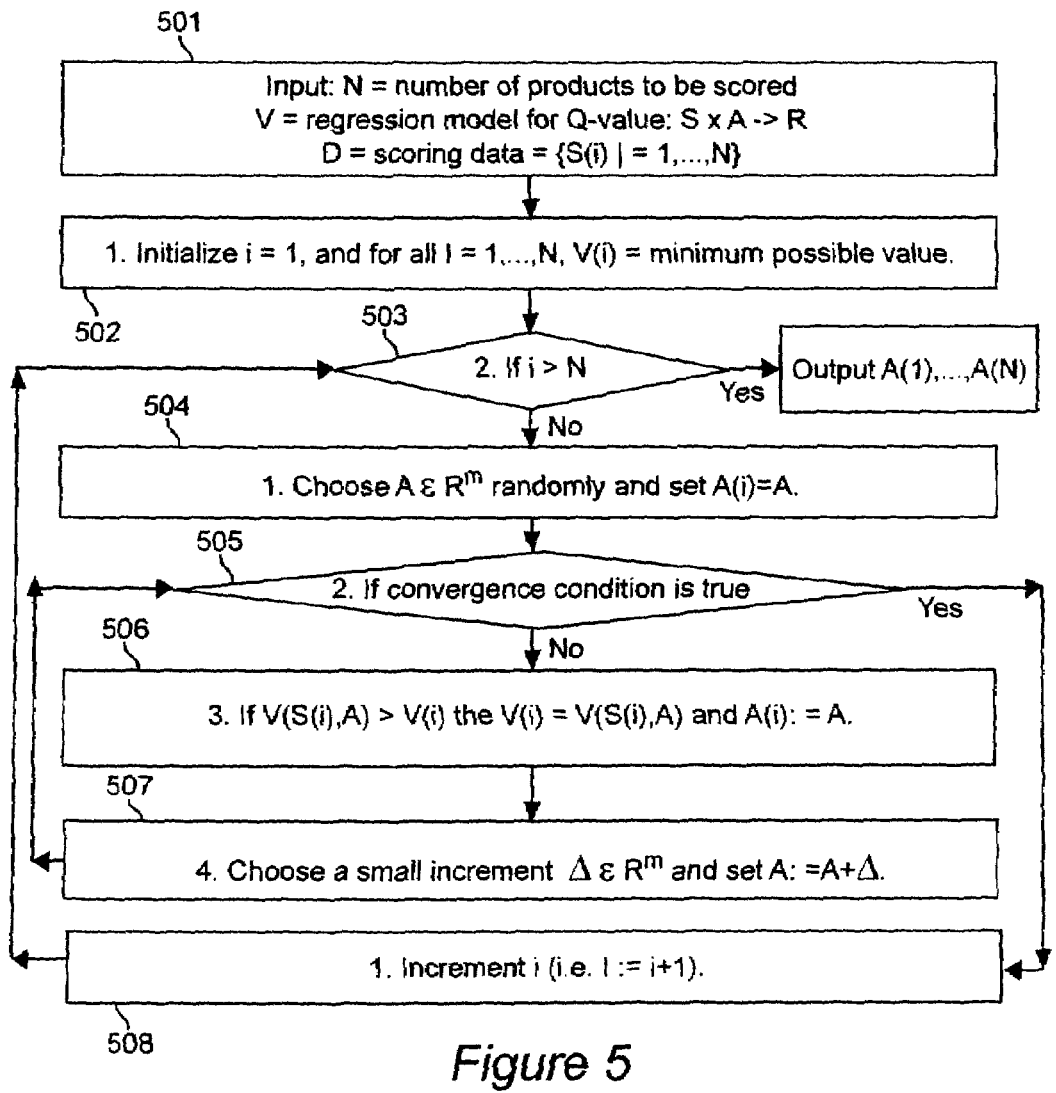
FIG. 5 is a flow chart for one possible scoring method.

There are a number of possible methods to achieve the above goal approximately. One example is to use the hill climbing method, which is shown in FIG. 5, and works as follows. Input block 501 inputs N, the number of products to be scored, V, the regression model for Q-value: S×A→R, and D, the scoring data: {S(i)|i=1, ..., N}. The process is initialized in function block 502 by setting i=1, and for all i=1, ..., N, setting V(i) to a minimum possible value. A determination is made in decision block 503 as to whether i>N and, if so, there is output A(1), ..., A(N); otherwise, in function block 504, choose A∈$R_m$ and randomly set A(i):=A. A determination is next made in decision block 505 as to whether a convergence condition is true. If so, the process goes to function block 508; otherwise, in function block 506, if V(S(i),A)>V(i), then V(i)=V(S(i), A) and A(i):=A. Next, in function block 507 choose a small increment Δ∈$R_m$ and set A:=A+Δ. Then, in function block 508 the index I is incremented, i.e., i:=i+1, and the process returns to decision block 503. Thus, starting with an initial action vector, which can for example be set randomly, the process makes use of the output model to determine a small incremental change in which direction would result in the largest possible improvement in the value function. It then makes a small incremental change to the current action vector. The procedure works by iterating the above process until some convergence criterion is met. Given a non-linear regression model, such a process is not guaranteed to converge to the best action vector for the given value function and the given state feature vector. Nonetheless, it is an efficient method that gives reasonably good performance, as compared to an enumerative method that generates action vectors on all grid points with certain granularity, and applies the value function model to them all, and then to determine the best action vector.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of marketing optimization with respect to brand lifetime management for a brand having a lifetime and that comprises one or more branded products, comprising the steps performed by a computer of:

storing data that relate to the one or more branded products of the brand but are not tied to individual customers, the data being characterized by impossibility to ascertain individual customers from the data;

wherein the storing step includes storing;
  (a) transaction data that contain historical, dated records of transactions, with information that specifies what products were sold and corresponding sales amount with or without specifying profit amount, the data being characterized by impossibility to ascertain individual customers from the data;
  (b) marketing data which consist of historical, dated records of marketing actions, the data being characterized by impossibility to ascertain individual customers from the data;
  (c) product taxonomy data, the data being characterized by impossibility to ascertain individual customers from the data, accessing the transaction data, marketing data and product taxonomy data and generating training data;

running a reinforcement learning procedure on the training data to generate a number of lifetime value models;

selecting a value model and, using scoring data on selected product types, scoring the selected product types using the selected model;

for a mix of marketing media, and using the stored data, performing a long term reward optimization in MDP; optimizing the marketing mix; and maximizing a net present value of profits and losses over a life cycle of the brand that comprises introducing the brand, developing the brand, maturing of the brand, fading of the brand, the brand driving other brands, the brand being profitable and the brand failing;

outputting an action vector that is a set of marketing actions which is a marketing mix optimization, optimized over the life cycle of the brand.

2. The method recited in claim 1, further comprising the step of displaying the generated models.

3. The method recited in claim 1, further comprising the step of evaluating the generated models and displaying results of the evaluation.

4. The method recited in claim 1, wherein scoring the selected product types is used to determine an optimal marketing action for any product item, given a value function model which is a function that determines an expected lifetime value given a state feature vector and an action feature vector.

5. The method of claim 1, including outputting a vector that specifies investment mix over a set of marketing media that comprises mass marketing, printing, TV, email and catalogues.

6. The method of claim 1, including steps of:

passing the stored transaction data, and marketing data and product taxonomy data, to a Data Preparation Module, wherein the passing is performed by a Data Storage Module; followed by generating training data and passing the generated data to a Reinforcement Learning Module, wherein the generating is performed by the Data Preparation Module;

running a batch reinforcement learning procedure on the input training data and generating a number of lifetime value models, wherein the running is performed by the Reinforcement Learning Module;

scoring a selected model, wherein the scoring is performed by a Scoring Module.

7. The method of claim 1, wherein the brand includes one product.

8. The method of claim 1, wherein the brand includes multiple products.

* * * * *